United States Patent
Rick (10) Patent No.: US 8,011,687 B2
(45) Date of Patent: Sep. 6, 2011

(54) AIR BAG MODULE, AIR BAG MODULE ARRANGEMENT, AND METHOD OF FASTENING

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 12/267,447

(22) Filed: Nov. 7, 2008

(65) Prior Publication Data

US 2009/0127833 A1 May 21, 2009

(30) Foreign Application Priority Data

Nov. 7, 2007 (DE) .................. 10 2007 052 973

(51) Int. Cl.
*B60R 21/16* (2006.01)
(52) U.S. Cl. ..................... 280/728.2; 280/732
(58) Field of Classification Search .................. 280/732, 280/728.2; 296/70
See application file for complete search history.

(56) References Cited

U.S. PATENT DOCUMENTS

| | | | | |
|---|---|---|---|---|
| 3,817,552 | A * | 6/1974 | Knight et al. ................. | 280/732 |
| 5,088,765 | A * | 2/1992 | Hirashima et al. ............ | 280/732 |
| 5,311,960 | A * | 5/1994 | Kukainis et al. ............. | 180/90 |
| 5,531,471 | A * | 7/1996 | Terai ............................. | 280/732 |
| 5,803,487 | A * | 9/1998 | Kikuchi et al. ............ | 280/728.2 |
| RE36,167 | E * | 3/1999 | Barnes ......................... | 280/732 |
| 7,125,466 | B2 | 10/2006 | Cooper et al. | |
| 2003/0001366 | A1 | 1/2003 | Debler et al. | |
| 2004/0094939 | A1 | 5/2004 | Debler et al. | |
| 2005/0121890 | A1 | 6/2005 | Kong | |
| 2009/0008956 | A1 * | 1/2009 | Scheib et al. .................. | 296/70 |

FOREIGN PATENT DOCUMENTS

| | | |
|---|---|---|
| DE | 4338666 A1 | 5/1995 |
| DE | 19610529 A1 | 9/1997 |
| DE | 19904100 A1 | 8/2000 |
| DE | 10021845 A1 | 11/2001 |
| DE | 10225813 A1 | 1/2004 |
| DE | 10253403 A1 | 6/2004 |
| DE | 10312947 A1 | 11/2004 |
| FR | 2800031 A1 | 4/2001 |

OTHER PUBLICATIONS

German Search Report dated Nov. 7, 2007, issued in Application No. 10 2007 052 973.4.
British Search Report dated Jan. 14, 2009, issued in Application No. 0820231.9.

* cited by examiner

*Primary Examiner* — Faye M. Fleming
(74) *Attorney, Agent, or Firm* — Ingrassia Fisher & Lorenz, P.C.

(57) ABSTRACT

An air bag module arrangement is provided for a motor vehicle, which includes, but is not limited to an air bag module a one driver-side dashboard panel that is fastened to an internal transverse support. In order to allow a simply constructed and simple fastening, the air bag module is fastened to an external transverse support of the external vehicle structure. An air bag and a method for fastening an air bag module, in particular for producing an air bag module arrangement, are also provided for a motor vehicle.

18 Claims, 6 Drawing Sheets

AIR BAG MODULE, AIR BAG MODULE ARRANGEMENT, AND METHOD OF FASTENING

CROSS-REFERENCE TO RELATED APPLICATION

This application claims priority to German Patent Application No. 102007052973.4, filed Nov. 7, 2007, which is incorporated herein by reference in its entirety.

TECHNICAL FIELD

The invention relates to an air bag module for a motor vehicle comprising a gas generator housing, a gas generator, and an air bag, as well as a fastening device for fastening to a transverse support. The invention also relates to an air bag module arrangement comprising an air bag module and comprising an at least one driver-side dashboard panel, which is fastened to an interior second transverse support at a distance from said first transverse support, as well as to a method for fastening an air bag module and also a method for triggering an air bag in an air bag arrangement.

BACKGROUND

Known from DE 43 38 666 and DE 103 12 947 are air bag modules and fastenings thereof, according to which the housing of the air bag module is suspended on the inner vehicle structure, an internal transverse support, by means of locking pins located on supports of the air bag housing. Screws fix the air bag module on the internal transverse support. Intermediate layers are provided between pins and transverse supports as elastomer components, which compensate tolerances of the inserted components and also decouple the air bag housing from vibrations of the structure. A connection of the air bag module to the internal vehicle structure, which is as rigid as possible, is thereby provided. This connection has proved to be particularly reliable, positionally stable, and long-lived.

Installation-space and production disadvantages can arise in relation to large-scale production. The air bag housing is fastened to the internal transverse support in the assembly process and then the dashboard panel (small marriage) is added in a further assembly step. For this reason, sufficient play or so-called "room for maneuver" must be provided between air bag module and dashboard panel. In modern dashboard panels such as cockpit devices, this assembly step is becoming increasingly more difficult due to the drastically increasing installation space density. During the small-marriage assembly step, joining the dashboard panel together on the internal transverse support, damage to the components of the dashboard panel can arise. This results in expensive extra work and disturbances in the overall production sequence. Frequently, the damage is not noticed immediately but only complained about subsequently by the end customer, leading to damage to quality and image.

It is further known to fasten the air bag module on the instrument panel. This concept has the disadvantage that the forces during triggering of the air bag and the mass of the air bag module must be absorbed by the instrument panel. Thus, particular stiffening measures for the dashboard panel are required. These measures require space and increase the component weight.

A dual air bag system comprising at least one central gas generator has become known from DE 100 21 845 A1 and DE 199 04 100 A1 describes an air bag arrangement with a space in front of the passenger seat, which is free from switch panels. The air bag is disposed in a centrally arranged console below the windshield or on an A-pillar for the passenger or additionally also for the driver, having an oblique direction of movement in each case.

In view of the foregoing, it is at least one object of the invention to provide an air bag module, an air bag module arrangement, a fastening method, and a method for triggering an air bag of the type specified initially, which can be carried out simply and reliably with a simple structure, in particular while maintaining an intact windshield and which allows a simple fastening, as well as no longer having the disadvantages described initially, whereby more space or interior space should be provided by the air bag module arrangement. In addition, other objects, desirable features, and characteristics will become apparent from the subsequent summary and detailed description, and the appended claims, taken in conjunction with the accompanying drawings and this background.

SUMMARY

According to an embodiment of the invention, the at least one object, and other objects, desirable features, and characteristics, is achieved by the air bag being fastenable on a first, external transverse support of an external vehicle structure, which follows the external bodywork contour. This has several advantages. A first, external transverse support has a positionally stable position, which has sufficient stiffness for a compact air bag module comprising gas generator housing, gas generator, and air bag. The external transverse support is designed to receive loads and for introducing forces into the vehicle structure as a crash-relevant component. The transverse support can thus absorb opposing forces, which are produced when the air bag is triggered. Additionally reinforced components are therefore not required for the air bag module. The total weight of the vehicle can thus be reduced. The realization at the first, external transverse support should be understood very broadly. The realization is not only restricted to the physical or artistic arrangement, but it should also express the fact that the air bag module can be fastened to the transverse support. In this case, the air bag module can be built in from outside onto the transverse support and also built into a correspondingly shaped transverse support. The first, external transverse support is therefore defining as part of the external bodywork structure. At the same time, the first transverse support can also be understood in the broader sense as an assembly which is arranged in the external bodywork area of the external bodywork structure as follows.

According to a preferred embodiment, the air bag module is configured to be adapted at least partially in a plan view parallel to a windshield in a profiled arcuate manner, in particular to the at least partially arcuate first transverse support, for receiving on or in said transverse support. To this end, the first transverse support has a receptacle, which is configured for fastening the air bag module in or on the receptacle. This has the advantage that the air bag module can be designed to be as space-saving and elongate as possible and is adapted to an aerodynamically configured bodywork structure. In contrast to this, conventional air bag modules are not arcuate because they are fastened to a second internal transverse support far in the interior of the vehicle in the instrument panel.

According to an embodiment of the invention, the object is achieved with an air bag module arrangement for a motor vehicle with an air bag module described above, whereby the air bag module is fastened on a first, external transverse support of an external vehicle structure following the external bodywork contour. An air bag module, which is fastened on a first external transverse support of the external vehicle structure in the vehicle interior very far toward to the front in the area of a windshield, creates an enormous space saving in the area of the dashboard panel both for the driver and for the passenger side. The space saving can be used in manifold ways in various embodiments.

A first, external transverse support, as described above, is therefore to be understood as bodywork struts or a bodywork assembly, which contribute toward the external design of the vehicle. The second internal transverse support for stiffening the vehicle does not belong to this. Internal transverse supports can be provided as supporting structure for the dashboard panel and the steering column.

The air bag module is preferably fastened directly on the first, external, at least partially arcuate transverse support of the external vehicle structure and separately to a second internal transverse support at a distance toward the inside, on which a dashboard panel is disposed. Thus, after assembly of the air bag module, the dashboard panel can thus be placed thereon.

In a preferred embodiment, the external transverse support of the external vehicle structure is a transverse support disposed in the lower region below the windshield and/or is a part of the bulkhead of the vehicle bodywork. The external transverse support can be configured as a pane holder or pane transverse support and can function as a fastening and retaining means for a lower section of a windshield. This has the advantage that no additional transverse support must be used for fastening the air bag module in the vehicle structure. Already provided rigid and positionally stable transverse supports are used.

Advantageous external transverse support is configured in the form of a stiffened metal sheet, preferably L-, T-, and/or I-profile shaped, in particular as a bulkhead profile. Such simply shaped transverse supports can be made of high-strength steels or light metal alloys and have several functions in the vehicle bodywork.

In a further preferred embodiment, the external transverse support is configured as a box-shaped hollow profile. A box-shaped hollow profile can in part be configured as considerably more rigid than a plate-shaped external transverse support. In addition, a box-shaped hollow profile can have receiving sides in order to fulfill further functions. The box-shaped hollow profile frequently forms a lower side edge, at which a windshield can be fastened. A further preferred embodiment for further reinforcement and stiffening of the box-shaped transverse support provides a multi-shell structure.

According to one embodiment, the air bag module is fastened to a high side of the box-shaped transverse support on the side of the passenger compartment. This has the advantage that a conventionally provided box-shaped transverse support must be modified insignificantly to accommodate an air bag module. In addition, the stiffness of the box-shaped transverse support is not impaired by the air bag module. In order to save weight, the box-shaped transverse support forms a housing base and housing side walls of the air bag module.

According to a particularly advantageous embodiment, the air bag module is accommodated in the external transverse support. The external transverse support is therefore open at least upwardly or obliquely upwardly to the passenger compartment and parallel to the windshield to be mounted, in order to receive the air bag module. This has the further advantage that an extreme amount of installation space can be saved.

According to a further preferred embodiment, the transverse support is configured to be tray-shaped with an adjoining tray-shaped profile section, in which the air bag module is inserted. Such an embodiment combines the advantages of a boxed-shaped profile structure of a transverse support with a space-saving embodiment.

According to a particularly preferred embodiment, the air bag module is configured as a closing side of a side of the box-shaped transverse support which is open to receive the air bag. The box profile is thereby additionally reinforced by the air bag module.

According to a further preferred embodiment, the air bag module is fastened to flanges formed on the transverse support, in particular by means of screws. Thus, the open side of the transverse support is screwed tightly.

In addition, in a further preferred embodiment, the box-shaped transverse support with or without a tray-shaped profile section can form a housing base and housing side walls of the air bag module. Thus, an additional housing for the air bag module is not required, thereby further reducing the vehicle weight and the number of components.

According to a special embodiment, the air bag module with the transverse support is fastened on a base-forming section of the gas generator housing or a module shell accommodating the gas generator housing. Such an arrangement has the advantage that the fastening of the air bag module directly in the direction of force of the air bag during its unfolding is achieved with an advantageously short force flow path. In addition, assembly can be particularly simple and a housing advantageously omitted.

According to a further preferred embodiment, the air bag module is configured with a first unfolding direction, which is aligned at an acute angle or substantially parallel to the windshield. Thus, the unfolding of the air bag proceeds trouble-free and the air bag is guided spatially at the windshield in its early unfolding phase. Particularly homogeneous air bag kinetics are obtained. The windshield is not destroyed by the air bag since the air bag does not impinge on the windshield at an impact angle of about 900, but opens so that it expands parallel or at an acute angle and thus rapidly reaches its end position, which means a high protection potential for the passenger or passengers.

If is further preferred if the air bag module is configured with a second unfolding direction, which is aligned substantially at right angles, in particular in the range of 79°-100°, relative to the windshield. Thus, the substantially parallel unfolding direction of the air bag is ensured. In addition, the air bag module is simple and easy to mount or to dismount for reworking in the production line or in the case of servicing. This is particularly advantageous if an air bag cover is fastened directly to the air bag module.

According to a measure which further develops one or more embodiments of the invention, a dashboard panel with an air bag cover and an outlet channel is placed on the air bag module. Separation of the air bag cover and air bag module reduces the production steps and at the same time creates a uniform attractive surface since the air bag cover is integrated in the dashboard panel.

According to a preferred embodiment, the air bag module is disposed on the driver side and/or particularly preferably on the passenger side. The air bag module can therefore advantageously be disposed in front of the dashboard panel of the driver and/or on the passenger side. On the passenger side, an air bag module displaced far to the front gives sufficient space to advantageously configure the area of the dashboard panel for the passenger, according to the desires and requirements of the customer. An air bag module according to an embodiment of the invention, arranged on the driver's side also makes it possible to have a neutral vehicle interior configuration regardless of on which side the cockpit with steering column is ultimately disposed. In addition, the conventionally arranged driver air bag can be designed to be slimmer or optionally dispensed with at conventional locations such as, for example, on the steering wheel. The steering wheel is therefore optionally lighter, which can have an advantageous effect on the reinforcement to be applied to the steering wheel drive.

A method for fastening an air bag module is also provided in accordance with an embodiment of the invention, in particular for producing an air bag module arrangement having the features described above whereby in a first step the air bag module is fastened on or in an external transverse support or a transverse support pertaining to an external vehicle structure toward the passenger compartment. The method has the advantage that the air bag module can be fastened very easily from outside to the external vehicle structure before the so-called small marriage (i.e., before the dashboard panel is mounted). Since the air bag module is not fastened in the vehicle interior on an interior transverse support but in the outer region of a vehicle bodywork, the fastening points of the air bag module are therefore more easily accessible. Damage to the air bag module during subsequent placement of a dashboard panel is therefore better avoided and brings with it consequent advantages such as, for example, a higher production quality.

According to a preferred method, the air bag module is screwed, riveted, clinched, adhesively bonded, locked, clamped, suspended and/or inserted on the outer transverse support. The air bag module can thus advantageously be mounted simply and rapidly on the external transverse support by a plurality of fastening methods, which can optionally be combined with one another, and can optionally be dismounted for repair and can be repaired.

According to a preferred method, in a second step an attachment component, in particular a dashboard panel or a dashboard panel cladding is placed on the air bag module. The air bag module can provide a supporting and also retaining function for the component to be placed thereon. The air bag module can therefore easily be mounted. The mounting of the attachment component on a ready-fastened air bag module simplifies assembly in contrast to an attachment component integrated with an air bag module.

In an alternative fastening method, the air bag module and the attachment component are joined together before assembly of the vehicle and then the air bag module together with the attachment component is fastened on the transverse support of the vehicle.

A method for triggering an air bag in an air bag arrangement as described above is also provided in accordance with an embodiment of the invention, whereby an air bag of the air bag module is unfolded substantially parallel to the windshield in a first unfolding process. This has the advantage that the air bag can unfold homogeneously with particular kinematics rapidly into its end position with an improved protection potential for the occupants, whereby any loading on the windshield due to the unfolding of the air bag substantially inclined or parallel to the windshield is largely reduced. An angle of impact of the air bag to the windshield of about 90° is thus avoided in contrast to the prior art. Any damage to the windshield is thus eliminated. The windshield remains intact.

According to an embodiment, which further develops the invention, the air bag is unfolded between the windshield and the dashboard panel in a second unfolding process in the direction of the interior or occupants. Thus, two unfolding processes are provided according to the invention. In the first, an unfolding substantially parallel to the windshield takes place and in the second unfolding process, unfolding takes place in the direction of the interior or the occupant, which can be softened and gentle for the occupants. In the first and second unfolding process, the air bag is advantageously inflated in the longitudinal direction of the vehicle and not diagonally or transversely to the longitudinal direction of the vehicle. Thus, a direct and short restraining path opposite to the main forward direction of the vehicle is achieved.

According to a further embodiment of the invention, an air bag module arrangement is provided for a motor vehicle comprising a first transverse support and comprising an air bag module, which has at least one gas generator and an air bag. In this case, the first transverse support can be disposed adjacently to a lower end section of a windshield and/or is configured as part of a bulkhead of the motor vehicle bodywork. This support is preferably configured as a pane holder or pane transverse support and can be provided to fasten and/or receive a lower end section of the windshield. This transverse support has at least one receptacle for receiving and fastening the air bag module.

In this case, it is provided in particular that the receptacle of the transverse support for the air bag module has at least two fastening points spaced apart from one another, at which the air bag module can be connected non-positively and/or positively to the transverse support.

According to a preferred embodiment, it is provided that the receptacle of the transverse support has a receiving opening, in which the air bag module can be inserted, at least in sections. To this end, it is provided, for example, that the transverse support is configured as a hollow profile at least in the area of the receptacle and that the air bag module in the mounting position on the transverse support comes to lie at least with its gas generator and the air bag, passing through the receiving opening inside the hollow profile.

It can further be provided that the receptacle of the transverse support for receiving the air bag module is configured as tray-shaped or having a U-profile-like cross-section. In this case, the lateral legs of the tray or of the U-profile section form a housing for the air bag module so that a separate housing for the air bag module can be saved. At the same time, it is furthermore feasible that due to the fastening of the air bag module on the transverse support, its receiving opening is closed and the components of the air bag module are disposed in a closed and outwardly dust- and moisture-proof cavity of the transverse support.

It is understood that the features specified hereinbefore and explained hereinafter can be used not only in the respectively specified combination but also in other combinations.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
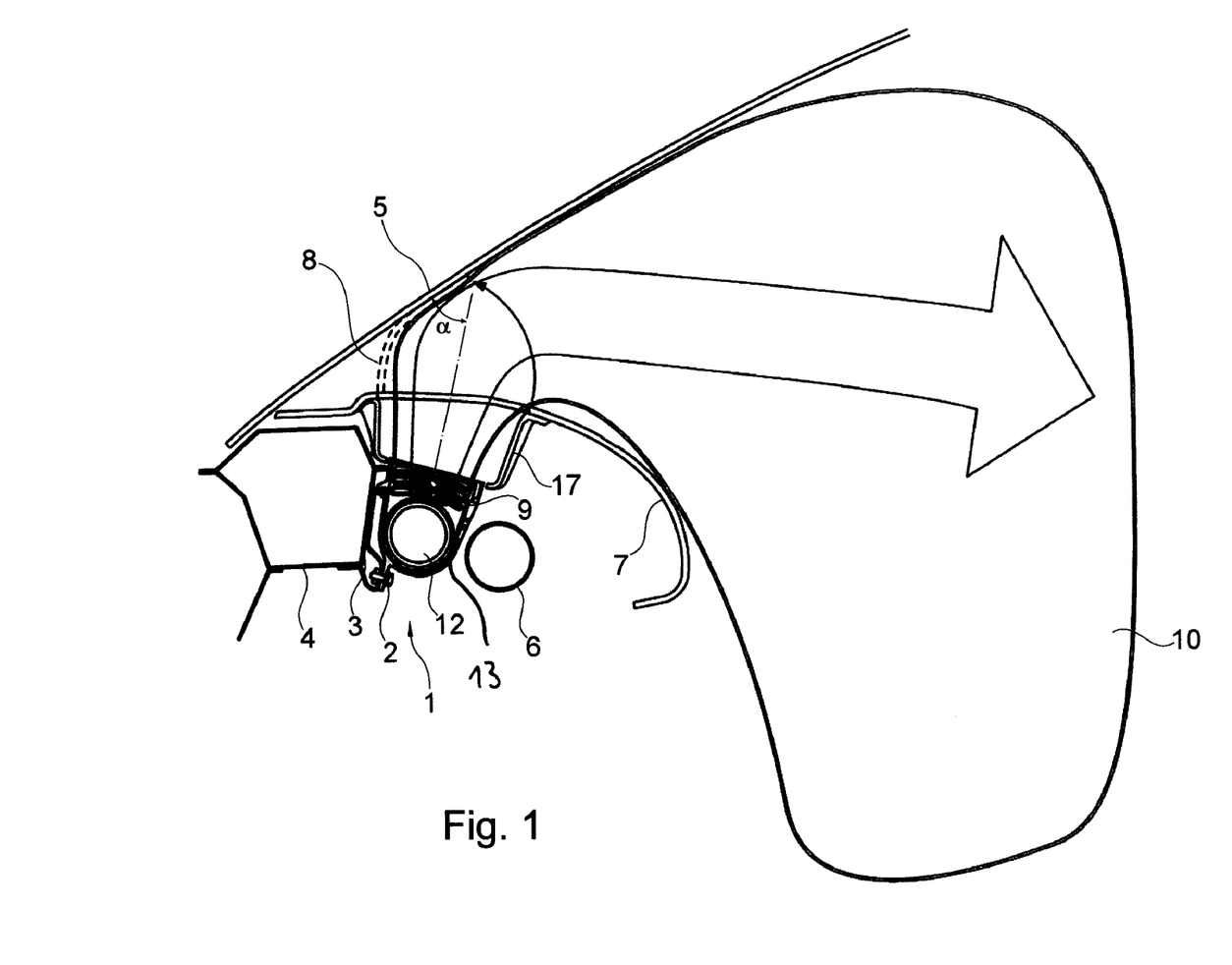
FIG. 1 shows a cross-section of an air bag module arrangement according to a first embodiment.

FIG. 1 shows in cross-section a first particular embodiment of an air bag module arrangement according to an embodiment of the invention with an air bag module 1 according to an embodiment of the invention. The air bag module is fastened by means of a screw connection 2 and a hook connection 3 as a fastening device to a box-shaped external transverse support 4 toward the passenger compartment on a high side. The box-shaped transverse support 4 is configured as polygonal in cross section with a substantially rectangular cross-sectional structure. The box-shaped transverse support 4 serves as a supporting structure for a windshield 5. An internal transverse support 6 at a distance from the external transverse support 4 and from the passenger compartment serves on the one hand as a crash-relevant safety component to improve the passive vehicle safety and to increase the rigidity of the passenger compartment and on the other hand, to support a dashboard panel 7.

Since the air bag module 1 is no longer fastened to the internal transverse support 6 as known previously from the prior art, but to an external transverse support 4, the transverse support 6 no longer needs to satisfy the strength requirements resulting from the development of force of an air bag module during unfolding of an air bag 9, 10. The transverse support 6 can therefore be designed to be simpler or cheaper in this region in order to satisfy previously described functional requirements.

A further feature of the air bag module 1 is decoupled from the dashboard panel 7 (i.e., is mounted separately before mounting the dashboard panel 7 on the outer transverse support 4). Mounting of the air bag module 1 is simplified for a fitter since the air bag module 1 must be fastened on the external motor vehicle frame and not in the vehicle interior. Extensive reaching into the vehicle frame is therefore not necessary, which reduces and eases the working movements. In addition, the security of correct mounting of the air bag module 1 is increased, which leads to little reworking or damage during further assembly with the dashboard panel 7. Quality and vehicle image are thereby improved.

During assembly, the dashboard panel 7 is placed over the air bag module 1. Located in the dashboard panel 7 is an air bag cover 8, which is folded out toward the windshield 5 when the folded air bag 9 is triggered.

In addition, an outlet channel 17 is formed in the dashboard panel 7, which initially leads the folded air bag 9 inside the dashboard panel 7 during unfolding. The folded air bag 9 is located in a housing 13 accommodating the air bag 9.

In this embodiment, the direction of unfolding of the folded air bag 9 is aligned at an acute angle α to the surface of the windshield 5. Unfolding forces of the inflating air bag 10, which are produced in a gas generator housing 12 accommodating a gas generator, are thus deflected by the windshield 5 in a first unfolding process substantially parallel to the windshield and in a second unfolding process, away from the windshield 5 in the direction of the vehicle interior, in order to prevent a hard impact, especially of the head of the vehicle occupant against vehicle parts in the front area. The unfolding forces do not act directly against the windshield 5, so that the risk of damage to the windshield 5 is prevented.

Figure 2:
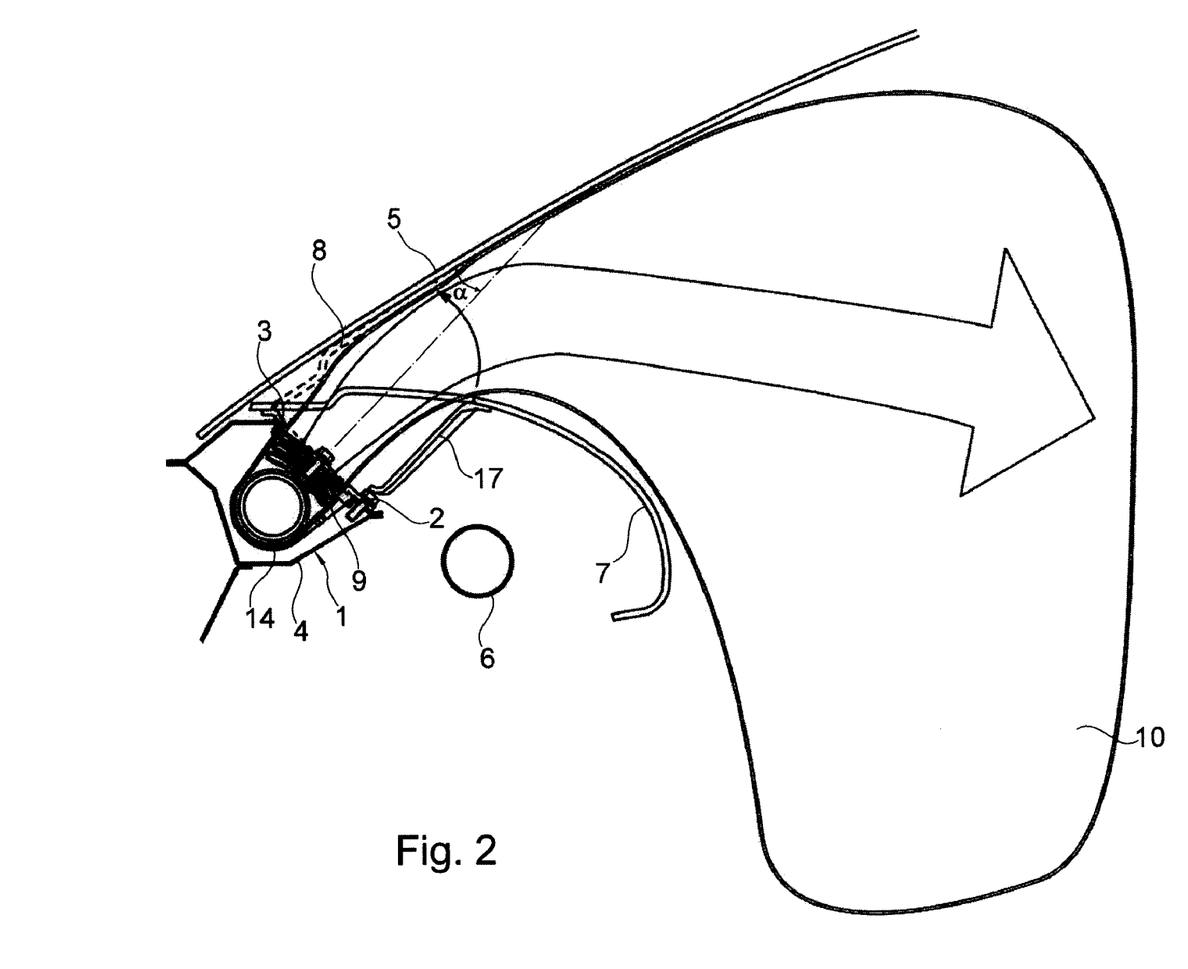
FIG. 2 shows an air bag module arrangement according to the invention in cross-section according to a second embodiment.

FIG. 2 shows a further preferred embodiment of the air bag module arrangement according to the invention. In this air bag module arrangement, the air bag module 1 is accommodated in the external transverse support 4. An air bag module housing 14 terminates the obliquely upwardly open transverse support 4. This additionally serves to increase the strength of the box-shaped transverse support 4, since the open legs of the transverse support 4 when viewed in cross section are held together with screw connections 2 and an opposite hook connection 3 from the air bag module housing 14.

In the embodiment according to FIG. 2, the air bag module 1 is aligned at a very acute, almost parallel angle α to the windshield 5. The outlet channel 17 continues the almost parallel alignment of the air bag module 1 in the dashboard panel 7. The unfolding direction of the folded air bag 9 thus runs at a very acute angle α almost parallel to the windshield 5. The windshield 5 thus has a more defined guiding function during unfolding of the air bag 9 to an inflated air bag 10 compared to the embodiment in FIG. 1. The action of force on the windshield 5 produced during the unfolding is significantly smaller. The opening angle of the air bag cover 8 is smaller and thereby loads the windshield more uniformly than in FIG. 1. As a result of a sloping termination in the outlet channel 17, the area of the air bag cover 8 is larger than in FIG. 1. The air bag 10 inflates as in FIG. 1 and covers the dashboard panel 7 from above.

Figure 3:
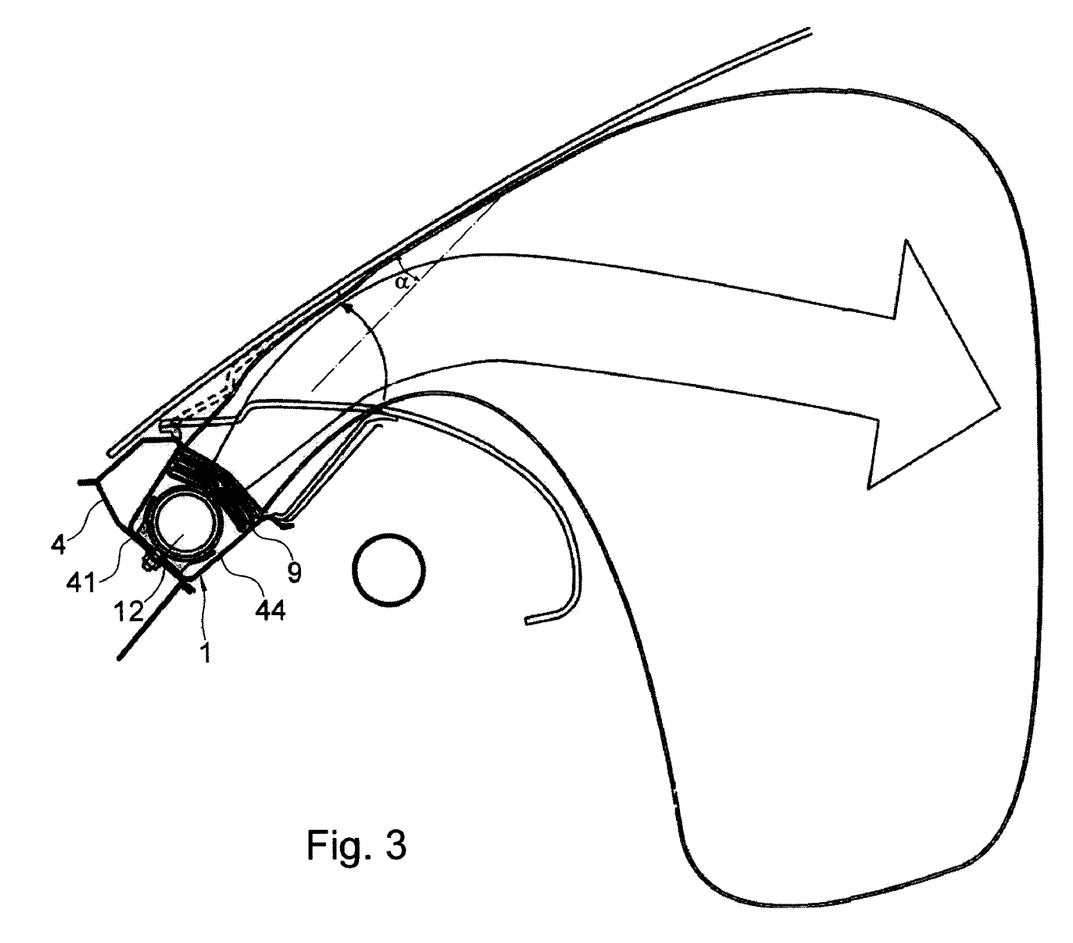
FIG. 3 shows a cross-section of an air bag module arrangement according to the invention in a third particular embodiment.

FIG. 3 shows a further particular embodiment of an air bag module arrangement. In this air bag module arrangement, the transverse support 4 is configured completely and in one piece in a box shape. A tray-shaped profile section 44 made of sheet metal is formed on one side and in one piece on the box-shaped transverse support 4. The tray-shaped profile section 44 is arranged toward the passenger compartment to accommodate the air bag module 1 and at the same time serve as a storage container for the air bag module 1. The air bag module 1 is accommodated in the tray-shaped profile section 44 without a housing 13, which holds the folded air bag. A lack of housing therefore reduces the number of components and the weight of the components. The air bag module 1 thus comprises the gas generator housing 12 holding the gas generator, with the folded air bag 9. The air bag module 1 is screwed at the base of the gas generator housing 12 with a base-forming section 41 of the tray-shaped profile section 44. The air bag 9 initially unfolds at an acute angle α to the windshield 5 and enlarges further to an inflated air bag 10 in the direction of the vehicle occupants to be protected. In this case, the air bag module is arranged substantially at a right angle, especially in the range of about 79°-100°, relative to the windshield.

Figure 4:
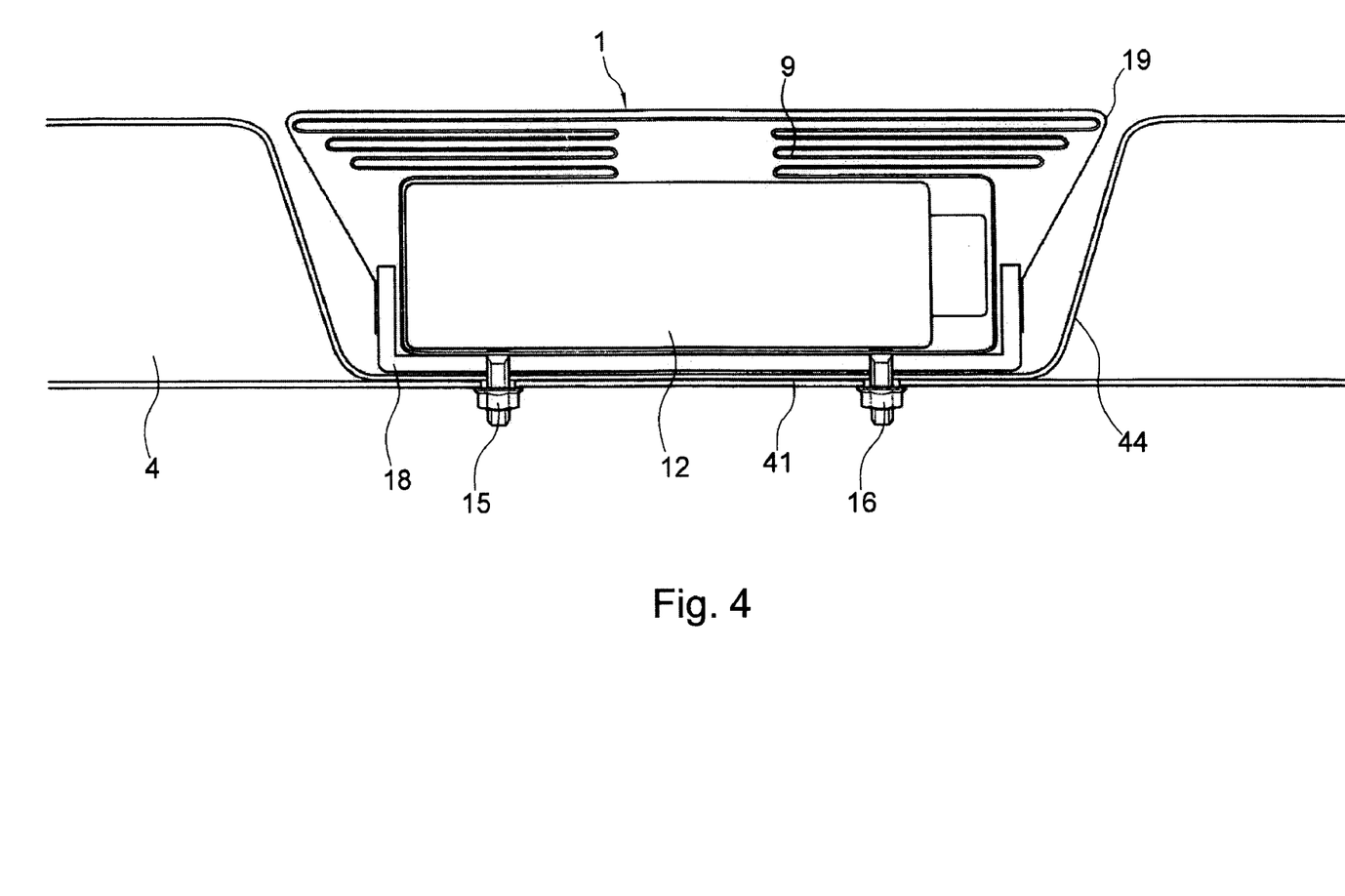
FIG. 4 shows an enlarged section of possible fastening of an air bag module according to the invention.

FIG. 4 shows in an enlarged section in cross section the transverse support 4 with a tray-shaped profile section 44 and the air bag module 1 fastened on the base of the transverse support 4. In this case, the gas generator housing 12 is mounted firmly on the base-forming section 41 of the transverse support 4 by means of screw connections 15, 16. The folded air bag 9 is surrounded by a protective sleeve 19, which holds the air bag 9 together during handling before, during, and after assembly of the air bag module 1. The protective sleeve 19 is fastened on an outer peripheral edge of a module shell 18. The module shell 18 is box-shaped and open toward the top. The module shell 18 holds the gas generator housing 12 with the gas generator and is fastened on the transverse support 4 by means of the screw connections 15, 16 of the gas generator housing 12. The protective sleeve 19 can be ripped on activation of the gas generator or removed after assembly.

Figure 5:
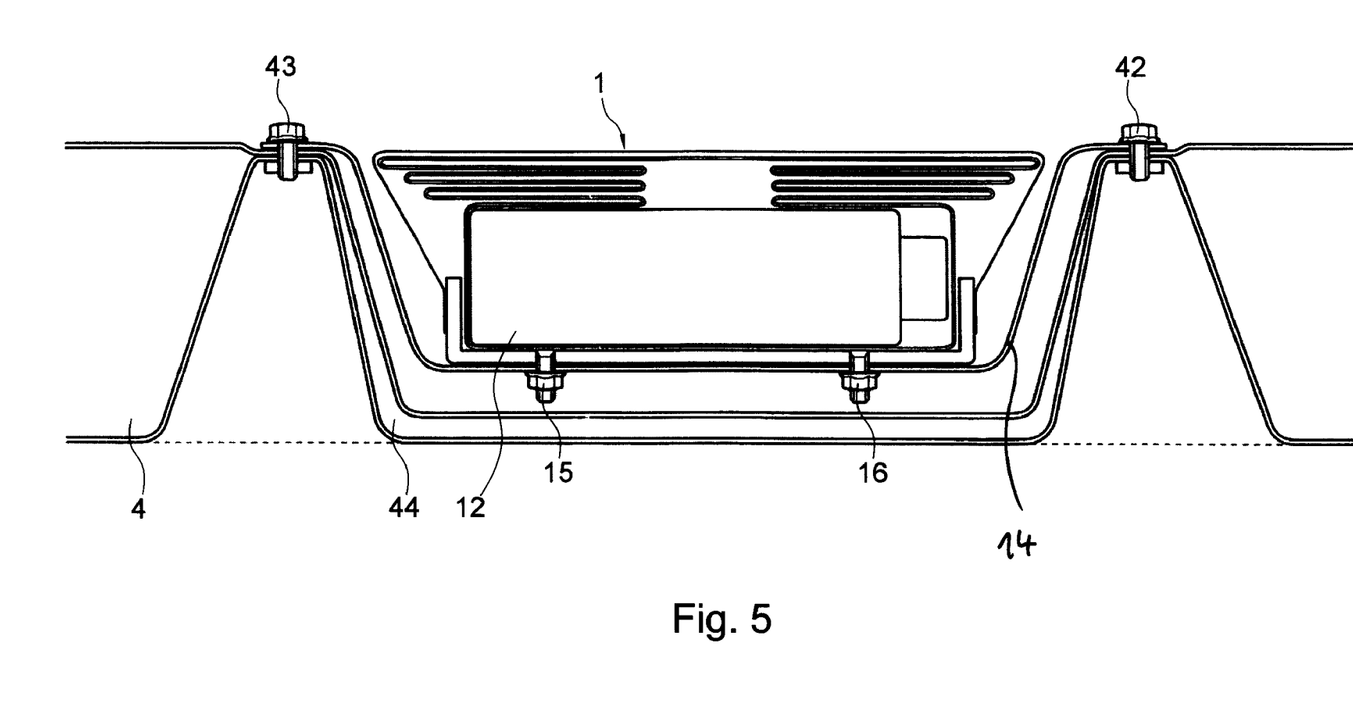
FIG. 5 shows another possible fastening of an air bag module according to the invention and FIG. 6 shows a perspective view of a front vehicle interior compartment area.

FIG. 5 shows a modification of an embodiment in an enlarged cross section. In this particular embodiment the tray-shaped profile section 44 is designed to be double-walled for intensified absorption of forces or dissipation of forces in the event of a crash. The tray-shaped profile section 44 of the transverse support 4 receives the air bag module 1. The gas generator housing 12 is screwed on the base of the air bag module 1 with the base of a plate-shaped air bag module housing 14 by means of screw connections 15, 16. The air bag module housing 14 has flanges at its peripheral edge. The flanges are screwed by means of screw connections 42, 43 on the box-shaped transverse support 4. A single- or multi-shell embodiment of the transverse support 4 depends on the production and strength conditions.

Figure 6:
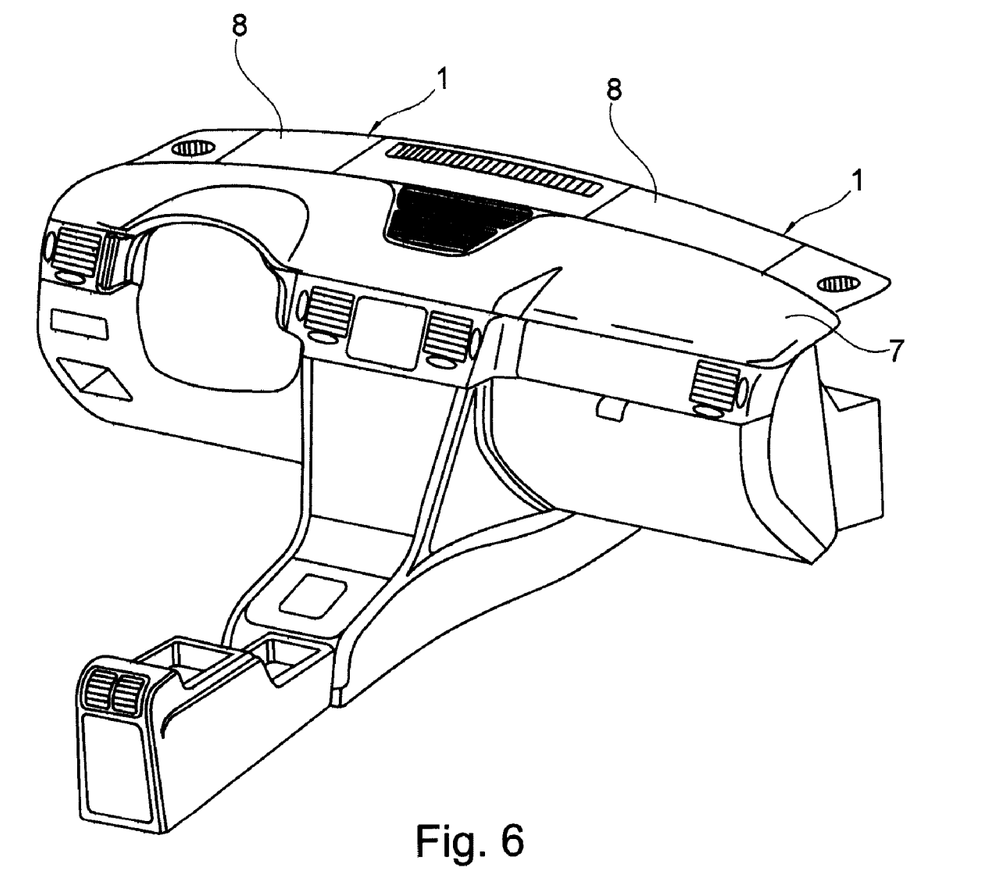

FIG. 6 shows a perspective view of a front vehicle interior area with a dashboard panel 7. The dashboard panel 7 is fastened on an internal transverse support 6 shown in FIGS. 1-3 and placed on an air bag arrangement according to the invention, so that an air bag module 1, which can be fastened on a transverse support 4, is located behind respectively one air bag cover 8 on the passenger and the driver side. Two air bag modules 1 are therefore arranged symmetrically to one another on the passenger and driver side and are dependent in dimensioning and design, on which side the cockpit with the steering column is disposed.

In particular, reference is made to the diagrammatic representation of all the figures as essential for the invention. The figures merely show a schematic diagram which is not to scale. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the summary and foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An air bag module arrangement for a motor vehicle having an external vehicle structure and an external bodywork contour, comprising:
    an air bag module;
    an internal transverse support;
    a fastening device adapted to fasten on a first external transverse support of the external vehicle structure, wherein the first external transverse support follows the external bodywork contour; and
    a driver-side dashboard panel that is adapted for fastening to the internal transverse support at a distance from said first external transverse support,
    wherein the air bag module is adapted at least partially in a plan view parallel to a windshield in a profiled arcuate manner and configured to receive said first external transverse support, and
    wherein the air bag module with the first external transverse support is fastened on a base-forming section of a gas generator housing of the air bag module.

2. The air bag module arrangement according to claim 1, wherein the air bag module is fastened directly on the first external transverse support and separately to the internal transverse support at a distance toward an inside on which a dashboard panel is disposed.

3. The air bag module arrangement according to claim 1, wherein the first external transverse support is a transverse support disposed in a lower region below the windshield.

4. The air bag module arrangement according to claim 1, wherein the first external transverse support is configured in a form of a stiffened metal sheet.

5. The air bag module arrangement according to claim 4, wherein the first external transverse support is configured as a box-shaped hollow profile and is multi-shelled.

6. The air bag module arrangement according claim 5, wherein the first external transverse support forms a housing base and a housing side wall of the air bag module.

7. The air bag module arrangement according to claim 1, wherein the air bag module is accommodated in the first external transverse support.

8. The air bag module arrangement according to claim 1, wherein the air bag module is inserted in a tray-shaped profile section of the first external transverse support.

9. The air bag module arrangement according to claim 1, wherein the first external transverse support is configured as a box-shaped hollow profile and the air bag module is configured as a closing side of the first external transverse support.

10. The air bag module arrangement according to claim 1, wherein the air bag module is fastened to a flange formed on the first external transverse support.

11. The air bag module arrangement according to claim 1, wherein the air bag module is configured with a first unfolding direction aligned to the windshield at least one of an acute angle or substantially parallel.

12. The air bag module arrangement according to claim 1, wherein a dashboard panel with an air bag cover and an outlet channel is placed on the air bag module.

13. The air bag module arrangement according to claim 1, wherein the air bag module is configured with a second unfolding direction and substantially aligned substantially at an angle in a range of about 79°-100° relative to the windshield.

14. An air bag module arrangement for a motor vehicle having an external vehicle structure and an external bodywork contour, comprising:
    an air bag module;
    an internal transverse support;
    a fastening device adapted to fasten on a first external transverse support of the external vehicle structure, wherein the first external transverse support follows the external bodywork contour; and
    a driver-side dashboard panel that is adapted for fastening to the internal transverse support at a distance from said first external transverse support,
    wherein the air bag module is adapted at least partially in a plan view parallel to a windshield in a profiled arcuate manner and configured to receive said first external transverse support, and the air bag module is fastened directly on the first external transverse support and separately to the internal transverse support at a distance toward an inside on which a dashboard panel is disposed.

15. The air bag module arrangement according to claim 14, wherein the first external transverse support is a transverse support disposed in a lower region below the windshield.

16. The air bag module arrangement according to claim 14, wherein the first external transverse support is configured in a form of a stiffened metal sheet.

17. The air bag module arrangement according to claim 16, wherein the first external transverse support is configured as a box-shaped hollow profile and is multi-shelled.

18. The air bag module arrangement according claim 17, wherein the first external transverse support forms a housing base and a housing side wall of the air bag module.

* * * * *